United States Patent
Izumi et al.

(10) Patent No.: US 12,531,230 B2
(45) Date of Patent: Jan. 20, 2026

(54) METHOD FOR PRODUCING ELECTRODE AND ELECTRODE MIXTURE

(71) Applicant: Panasonic Intellectual Property Management Co., Ltd., Osaka (JP)

(72) Inventors: Reiko Izumi, Osaka (JP); Shinichiro Kondo, Osaka (JP); Daisuke Katou, Kyoto (JP); Takuya Jin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 715 days.

(21) Appl. No.: 17/909,151

(22) PCT Filed: Jan. 19, 2021

(86) PCT No.: PCT/JP2021/001562
§ 371 (c)(1),
(2) Date: Sep. 2, 2022

(87) PCT Pub. No.: WO2021/181887
PCT Pub. Date: Sep. 16, 2021

(65) Prior Publication Data
US 2023/0104306 A1    Apr. 6, 2023

(30) Foreign Application Priority Data

Mar. 11, 2020    (JP) ................. 2020-041959

(51) Int. Cl.
*H01M 4/04*    (2006.01)
*H01M 4/02*    (2006.01)
(Continued)

(52) U.S. Cl.
CPC ......... *H01M 4/0435* (2013.01); *H01M 4/485* (2013.01); *H01M 4/623* (2013.01); *H01M 2004/028* (2013.01)

(58) Field of Classification Search
CPC .... H01M 4/0435; H01M 4/485; H01M 4/623; H01M 2004/028; H01M 4/0404; H01M 4/131; H01M 4/1391
See application file for complete search history.

(56) References Cited

U.S. PATENT DOCUMENTS

2005/0079599 A1*    4/2005    Bulan ................... C25B 11/031
205/777.5
2005/0250011 A1    11/2005    Mitchell et al.
(Continued)

FOREIGN PATENT DOCUMENTS

CN    101194384 A    6/2008
JP    H054247 A * 1/1993
(Continued)

OTHER PUBLICATIONS

Extended (Supplementary) European Search Report dated Jul. 9, 2024, issued in counterpart EP Application No. 21766832.6. (7 pages).
(Continued)

*Primary Examiner* — Ula C Ruddock
*Assistant Examiner* — Sydney L Kline
(74) *Attorney, Agent, or Firm* — WHDA, LLP

(57) ABSTRACT

According to this method for producing an electrode, a fibrous binder is produced by fibrillating a particulate binder, which has a volume-based median diameter of from 5 to 100 μm, by means of the application of a shear force, and an electrode mixture is produced by mixing the fibrous binder with an active material, said electrode mixture having a solid content concentration of substantially 100%. It is preferable that the fibrillation is carried out so that the breaking peripheral velocity ratio of the electrode mixture is 8 or more. In addition, an electrode mixture sheet is produced by shaping the electrode mixture into a sheet form by rolling,
(Continued)

and the electrode mixture sheet is subsequently bonded to a core material.

4 Claims, 2 Drawing Sheets

(51) Int. Cl.
    *H01M 4/485*     (2010.01)
    *H01M 4/62*     (2006.01)

(56) References Cited

U.S. PATENT DOCUMENTS

| | | |
|---|---|---|
| 2012/0251858 A1 | 10/2012 | Kato et al. |
| 2014/0127570 A1 | 5/2014 | Dandrea |
| 2014/0342225 A1 | 11/2014 | Isshiki et al. |
| 2017/0001155 A1* | 1/2017 | Chaen .................... B01D 69/02 |
| 2017/0098826 A1* | 4/2017 | Mitchell ................ H01M 4/131 |
| 2017/0256367 A1 | 9/2017 | Raman et al. |
| 2019/0305316 A1 | 10/2019 | Wang et al. |
| 2021/0098770 A1 | 4/2021 | Yudi et al. |

FOREIGN PATENT DOCUMENTS

| | | | |
|---|---|---|---|
| JP | 11-329904 A | 11/1999 | |
| JP | H11329904 A * | 11/1999 | ............. Y02E 60/10 |
| JP | 2002201217 A * | 7/2002 | ............. C08F 214/26 |
| JP | 2007220747 A * | 8/2007 | ................ B22F 3/18 |
| JP | 2008-541339 A | 11/2008 | |
| JP | WO2009044856 A1 * | 2/2011 | ............. H01G 11/28 |
| JP | 2013-42053 A | 2/2013 | |
| JP | 2013-77560 A | 4/2013 | |
| JP | 2014-522563 A | 9/2014 | |
| JP | 2019-512872 A | 5/2019 | |
| WO | 2019/222110 A1 | 11/2019 | |

OTHER PUBLICATIONS

International Search Report dated Apr. 6, 2021, issued in counterpart International Application No. PCT/JP2021/001562 (2 pages).

* cited by examiner

METHOD FOR PRODUCING ELECTRODE AND ELECTRODE MIXTURE

CROSS-REFERENCE TO RELATED APPLICATION

This application is a National Phase Application filed under 35 U.S.C. § 371 of International Application No. PCT/JP2021/001562 filed on Jan. 19, 2021 which claims the benefit of priority under 35 U.S.C. § 119(a) of Japanese Patent Application No. 2020-041959 filed in Japan on Mar. 11, 2020, the contents of which are incorporated herein by reference.

TECHNICAL FIELD

The present disclosure generally relates to a method of manufacturing an electrode and an electrode mixture, and particularly to a method of manufacturing an electrode and an electrode mixture preferable for a non-aqueous electrolyte secondary battery such as a lithium-ion battery.

BACKGROUND ART

An electrode of a non-aqueous electrolyte secondary battery such as a lithium-ion battery is typically manufactured with a wet method in which an electrode mixture slurry including an active material, a binder, and the like is applied onto a surface of a core being a metal foil. In this case, a drying step of evaporating and removing a solvent included in the coating film is required, and another problem is that migration, the travelling of the binder during drying of the coating film, easily occurs. The binder migration increases the amount of the binder on the surface side compared with the core side of the coating film (electrode mixture layer), leading to uneven distribution of the binder in the thickness direction of the electrode mixture layer.

Proposed in recent years is a dry method including rolling an electrode mixture and forming into a sheet to produce an electrode mixture sheet and laminating the sheet onto a core to manufacture an electrode (for example, see Patent Literature 1 and 2). Here, Patent Literature 1 describes use of a composite particle powder containing an electrode active material and a binder in manufacturing the electrode mixture sheet. In Patent Literature 1, a fluidized-bed granulating method and a spray-drying granulating method are listed as a method of obtaining the composite particle powder. In both methods, predetermined raw materials are dispersed or dissolved in a solvent to produce a slurry, this slurry is dried to produce the composite particle powder, and the composite particle powder is compressed to form a compressed powder layer.

In the dry method, using a fibrous binder that is fibrillated is proposed. For example, Patent Literature 2 describes that an active material, a particulate binder, and a conductive agent are mixed by using a mill, and then a large shear force is applied to this mixture with a high pressure for treatment in a long time to accelerate fibrillation of the binder.

CITATION LIST

Patent Literature

PATENT LITERATURE 1: Japanese Unexamined Patent Application Publication No. 2013-77560

PATENT LITERATURE 2: Japanese Translation of PCT International Application Publication No. 2019-512872

SUMMARY

When a slurry including a binder is used in producing an electrode, a powdery binder is dissolved in a solvent of the slurry to allow the binder to exhibit a binding property, resulting in achievement of adhesiveness by the binder in a mixture layer and between the mixture layer and the core. However, the solvent is required to be dried from the slurry, and thus labor saving in the step and equipment are difficult. Both of the fluidized-bed granulating method and the spray-drying granulating method disclosed in Patent Literature 1 require drying the solvent from the slurry.

In the manufacture of an electrode with the dry method without a solvent, a degree of fibrillation of the binder and a mixing state of the materials constituting the electrode mixture significantly affect formability of an electrode mixture sheet and a rupture strength, for example. As a result of investigation by the present inventors, it has been found that, as disclosed in Patent Literature 2, applying a large shear force to the electrode mixture for treatment in a long time deteriorates the formability of the electrode mixture sheet, leading to a significantly lowered rupture strength.

An electrode mixture according to the present disclosure is an electrode mixture including: an active material; and a fibrous binder, wherein in forming the electrode mixture into a sheet, a rupture peripheral speed ratio is 8 or more that is a peripheral speed ratio of a pair of forming rolls when the sheet is ruptured (a linear pressure of the two rolls is set to be 0.03 t/cm, a gap thereof is set to be 0 μm, and a peripheral speed of one roll is set to be 5 m/min).

A method of manufacturing an electrode according to the present disclosure comprises: applying a shear force to a particulate binder having a median diameter on a volumetric basis of 5 to 100 μm for fibrillation to produce a fibrous binder; mixing the fibrous binder and an active material to produce an electrode mixture having a solid content concentration of substantially 100%, and rolling the electrode mixture and forming into a sheet to produce an electrode mixture sheet; and laminating the electrode mixture sheet onto a core. The particulate binder is fibrillated so that, in forming the electrode mixture into a sheet, a rupture peripheral speed ratio is 8 or more that is a peripheral speed ratio of a pair of forming rolls when the sheet is ruptured (a linear pressure of the two rolls is set to be 0.03 t/cm, a gap thereof is set to be 0 μm, and a peripheral speed of one roll is set to be 5 m/min).

An aspect of the present disclosure may provide a method of manufacturing an electrode and an electrode mixture that may produce an electrode mixture sheet having excellent formability and a high rupture strength.

DESCRIPTION OF EMBODIMENTS

Figure 1A:
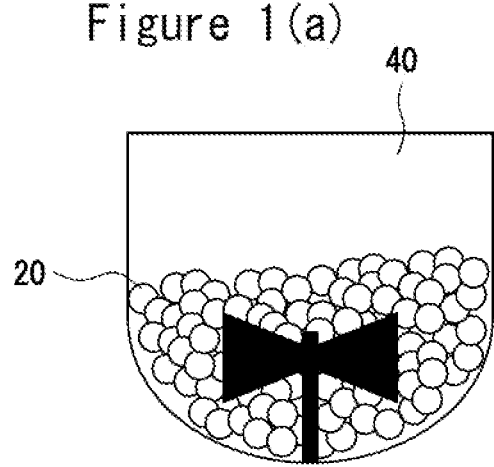
FIG. 1(a) and FIG. 1(b) are a view illustrating a step of manufacturing an electrode of an example of an embodiment.

Hereinafter, embodiments of a method of manufacturing an electrode and an electrode mixture according to the present disclosure will be described in detail. Embodiments described below is merely an example, and the present disclosure is not limited to the following embodiments. The drawings referred to in the description of embodiments are schematically illustrated, and a size ratio and the like of constituents illustrated in the drawings should be determined with considering the following description.

Although the electrode mixture and the electrode according to the present disclosure are preferable for a non-aqueous electrolyte secondary battery such as a lithium-ion battery, they may be applied to a battery including an aqueous electrolyte or a power storage device such as a capacitor. Hereinafter, an electrode mixture and an electrode (particularly, in a case of applying to a positive electrode) for a non-aqueous electrolyte secondary battery will be exemplified to make a description.

Figure 1B:
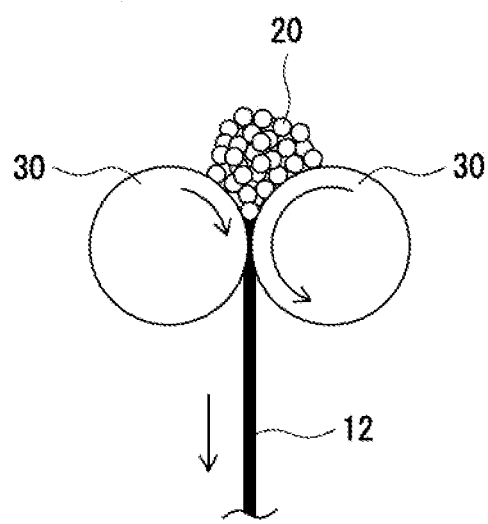
Figure 2:
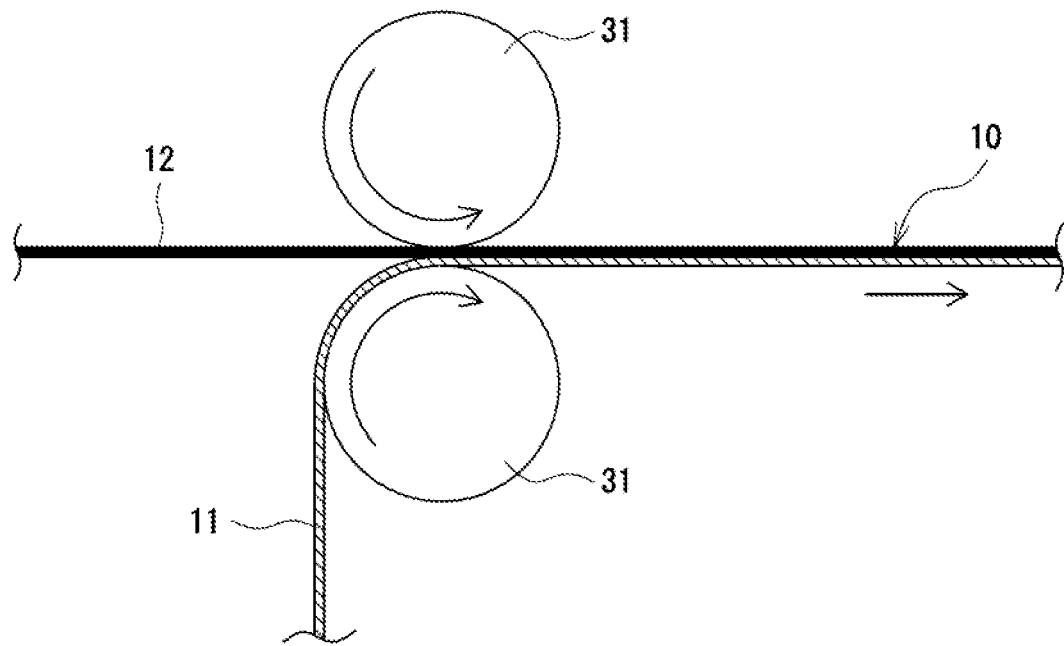
FIG. 2 is a view illustrating a step of manufacturing an electrode of an example of an embodiment.

FIG. 1(a). FIG. 1(b) and FIG. 2 are views schematically illustrating a step of manufacturing an electrode 10 of an example of an embodiment. As illustrated in FIG. 1(a), in the step of manufacturing the electrode 10, a shear force is applied to a particulate binder (hereinafter, referred to as "binder particles") for fibrillation to produce a fibrous binder 22 (see FIG. 3), and the fibrous binder 22 and an active material 21 (see FIG. 3) are mixed to produce an electrode mixture 20 having a solid content concentration of substantially 100%. Although details will be described later, required for the binder particles is using particles having a median diameter on a volumetric basis of 5 to 100 µm. Next, as illustrated in FIG. 1(b) and FIG. 2, the electrode mixture 20 is rolled and formed into a sheet to produce an electrode mixture sheet 12, and the electrode mixture sheet 12 is laminated onto a core 11. By the above steps, the electrode 10 is manufactured.

In the step of manufacturing the electrode 10, the binder particles, the active material 21, and, if necessary, a conductive agent and the like are added into a mixer to mix these materials with fibrillating the binder particles.

[Electrode]

As illustrated in FIG. 2, the electrode 10 comprises: the core 11; and the electrode mixture sheet 12 provided on a surface of the core 11. The electrode 10 may be a long electrode constituting a wound-type electrode assembly, and may be a rectangular electrode constituting a stacked-type electrode assembly. The electrode 10 is manufactured by laminating the electrode mixture sheet 12 onto the core 11 to be cut in a predetermined shape and size. Although the electrode 10 may be applied to a positive electrode, negative electrode, or both of them of a non-aqueous electrolyte secondary battery, particularly preferably applied to a positive electrode because the method of manufacturing a positive electrode according to the present disclosure does not require using an organic solvent as in a conventional method of manufacturing a positive electrode. The unnecessity of using an organic solvent means not merely unnecessity as a raw material but also unnecessity of a step of drying the organic solvent, which may eliminate necessity of exhaust equipment and the like associated with the drying step.

For the core 11, a metal foil, a film in which a metal layer is formed on a surface thereof, and the like may be used. A thickness of the core 11 is, for example, 5 to 20 µm. For the core 11 in the positive electrode, a metal foil containing aluminum as a main component may be used. In the negative electrode, a metal foil containing copper as a main component may be used. The main component herein means a component with the largest mass ratio. The core 11 may be an aluminum foil with substantially 100% of aluminum, and may be a copper foil with substantially 100% of copper.

The electrode mixture sheet 12 is provided on the surface of the core 11 to constitute the mixture layer of the electrode 10. The electrode mixture sheet 12 is preferably provided on both the surfaces of the core 11. The electrode mixture sheet 12 includes the active material 21 and the fibrous binder 22, and has a thickness of, for example, 30 to 120 µm, preferably 50 to 100 µm. By using the fibrous binder 22, the electrode mixture 20 can be rolled and formed into a sheet. The content of the fibrous binder 22 is preferably 0.05 to 5.0 mass % based on a mass of the electrode mixture sheet 12. The electrode mixture sheet 12 may include a non-fibrillated binder in addition to the fibrous binder 22.

Figure 3:
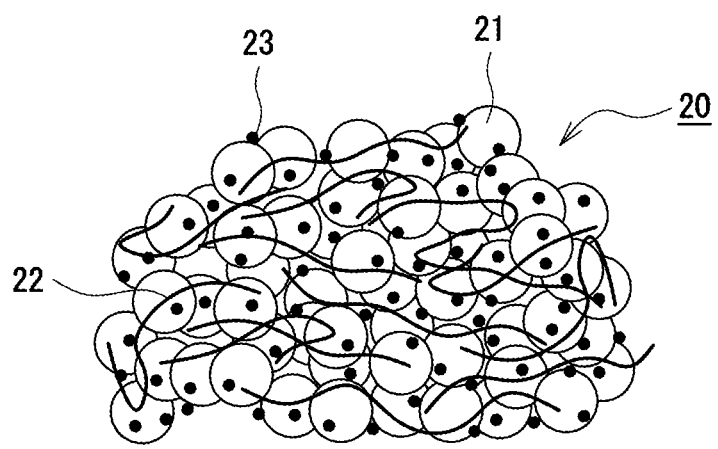
FIG. 3 is a view illustrating an electrode mixture of an example of an embodiment.

The electrode mixture sheet 12 may include a conductive agent 23 (see FIG. 3). Particularly in a case of the positive electrode, the conductive agent 23 is preferably used to improve electron conductivity in the electrode mixture sheet 12. As the conductive agent 23, carbon materials such as carbon black, acetylene black, Ketjenblack, and graphite may be exemplified. A content of the conductive agent 23 is, for example, 0.5 to 5.0 mass % based on a mass of the electrode mixture sheet 12. An example of a median diameter on a volumetric basis of the conductive agent 23 is 0.05 to 1 µm.

The electrode mixture sheet 12 is constituted with the active material 21 as a main component. A content of the active material 21 is preferably 85 to 99 mass %, and more preferably 90 to 98 mass %, based on a mass of the electrode mixture sheet 12. A median diameter on a volumetric basis of the active material 21 is, for example, 1 to 30 µm, and preferably 2 to 15 µm.

For an active material 21 of the positive electrode (positive electrode active material), a lithium-transition metal composite oxide is typically used. Examples of a metal element contained in the lithium-transition metal composite oxide include Ni, Co, Mn, Al, B, Mg, Ti, V, Cr, Fe, Cu, Zn, Ga, Sr, Zr, Nb, In, Sn, Ta, and W. Among them, at least one of Ni, Co, and Mn is preferably contained. For an active material 21 of the negative electrode (negative electrode active material), a carbon-based active material such as: a natural graphite such as flake graphite, massive graphite, and amorphous graphite; and an artificial graphite such as massive artificial graphite (MAG) and graphitized mesophase-carbon microbead (MCMB) is used, for example. For the negative electrode active material, a Si-based active material and the like that forms an alloy with lithium may also be used.

[Electrode Mixture]

FIG. 3 is a view schematically illustrating the electrode mixture 20 constituting the electrode mixture sheet 12. As illustrated in FIG. 3, the electrode mixture 20 includes the particulate active material 21 and the fibrous binder 22, and the fibrous binder 22 adheres to a particle surface of the active material 21 to be intertwined with the active material 21. In other words, the fibrous binder 22 present in a mesh shape holds the active material 21. Such a formation may also be observed in the electrode mixture sheet 12. When the electrode mixture 20 is a positive electrode mixture, the electrode mixture 20 preferably includes the conductive agent 23.

A rupture peripheral speed ratio of the electrode mixture 20 preferably satisfies 8 or more. The rupture peripheral speed ratio of the electrode mixture 20 is a rupture peripheral speed ratio when a test sheet for measuring a rupture peripheral speed ratio is formed. The rupture peripheral speed ratio may be measured by changing a peripheral speed ratio of a pair of forming rolls during formation of a test sheet from the electrode mixture 20 to specify a peripheral speed ratio when the sheet is ruptured. The sentence "the rupture peripheral speed ratio of the electrode mixture 20 preferably satisfies 8 or more" means that "the rupture peripheral speed ratio during formation of a test sheet for measuring a rupture peripheral speed ratio preferably satisfies 8 or more." When the rupture peripheral speed ratio of the electrode mixture 20 satisfies 8 or more, the binder included in the electrode mixture 20 may be determined to be appropriately fibrillated. The electrode mixture 20 satisfying this condition has excellent formability, and the electrode mixture sheet 12 having a high rupture strength may be produced from the electrode mixture 20 satisfying this condition. The rupture peripheral speed ratio is more preferably 9 or more, and further preferably 10 or more.

A method of measuring the rupture peripheral speed ratio of the electrode mixture is as follows. The rupture peripheral speed ratio may be measured by using an apparatus similar to the apparatus of rolling the electrode mixture and forming into a sheet, illustrated in FIG. 1(b). Also, in measuring the rupture peripheral speed ratio, the electrode mixture is rolled by using two rolls and the electrode mixture is formed into a sheet. When the electrode mixture is formed into a sheet, a linear pressure of the two constant-pressure rolls is set to be approximately 0.03 t/cm, a gap thereof is set to be 0 pin, a peripheral speed of one roll is fixed to be 5 m/min, and the electrode mixture is formed into a sheet with changing the peripheral speed ratio by 1 from 1 to 10 to specify the smallest peripheral speed ratio in peripheral speed ratios at which the sheet rupture is observed as the rupture peripheral speed ratio. The electrode mixture sheet obtained in this measurement of the rupture peripheral speed ratio of the electrode mixture corresponds to the above test sheet. The test sheet herein may also be read as the electrode mixture sheet.

The peripheral speed ratio is a peripheral speed of one roll that is expressed in ratio with respect to a peripheral speed of the other roll being 1. The rupture peripheral speed ratio, which is a peripheral speed ratio of the test sheet when the sheet is ruptured, is a peripheral speed of one roll when the test sheet is ruptured that is expressed in ratio with respect to a peripheral speed of the other roll being 1. A larger peripheral speed ratio of the two rolls enlarges a shear force in the lateral direction to be likely to rupture the test sheet; thus, a larger value of the peripheral speed ratio when the sheet is ruptured may be evaluated as a higher rupture strength of the sheet.

The electrode mixture 20 is preferably a mixture in which the active material 21, the fibrous binder 22, and the conductive agent 23 are uniformly dispersed. It is to be noted that the rupture peripheral speed ratio of the electrode mixture 20 is an indicator of dispersibility of the constituting materials. In the electrode mixture 20, less particle crack of the active material 21 is preferable and much conductive agent 23 are preferably adhere to the particle surface of the active material 21 to form a conductive path between the particles. That is, the electrode mixture 20 is required to be produced so that the particle crack of the active material 21 is inhibited while an amount of the conductive agent 23 adhering to the particle surface of the active material 21 by incorporating the conductive agent 23 in the fibrous binder 22 is not reduced. According to a manufacturing method described later, a good electrode mixture 20 satisfying such conditions may be produced.

[Method of Manufacturing Electrode]

Hereinafter, a method of manufacturing the electrode 10 will be further described in detail. Although the method of manufacturing the positive electrode including the conductive agent 23 will be exemplified below, this manufacturing method may be similarly applied to manufacture of the negative electrode. In a case of the negative electrode, a negative electrode active material is used instead of the positive electrode active material, and the conductive agent 23 may not be added.

As illustrated in FIG. 1(a), in the step of manufacturing the electrode 10, the binder particles are firstly added into a mixer 40, and a shear force is applied for fibrillation. In the present embodiment, the active material 21, the binder particles, and the conductive agent 23 are added into the mixer 40 to mix these materials with fibrillating the binder particles to produce the electrode mixture 20 (hereinafter, this step is referred to as "first step"). Next, as illustrated in FIG. 1(b), the electrode mixture 20 is rolled and formed into a sheet to produce the electrode mixture sheet 12 (hereinafter, this step is referred to as "second step"). This manufacturing step is a dry process for manufacturing the electrode 10 by using the electrode mixture 20 having a solid content concentration of substantially 100%.

The dry process will be additionally described below. The dry process is a process in which the active material particles and the binder particles are mixed without a solvent, that is, mixed in a state where a solid content concentration of the active material and the binder is substantially 100%. During the mixing, a material such as a conductive agent may be added in addition to the active material and the binder. Even when the other material is added in addition to the active material and the binder, a solid content concentration during the mixing in the dry process is substantially 100%.

The binder particles are preferably particles mainly composed of polytetrafluoroethylene (PTFE). Since being easy to be fibrillated, PTFE is preferable as the binder of the electrode mixture sheet 12. The binder particles may be constituted with substantially only PTFE, and may contain another component as long as the fibrillation is not impaired. In addition to the binder particles mainly composed of PTFE, a binder that is not fibrillated such as polyvinylidene fluoride (PVDF) may be used in combination.

As described above, required for the binder particles is using particles having a median diameter (D50) on a volumetric basis of 5 to 100 μm. In this case, when the active material 21, the fibrous binder 22, and the conductive agent 23 are uniformly dispersed, mixing with a large shear force in a long time is unnecessary. Thus, a particle crack of the active material 21 is inhibited, and the electrode mixture 20 in which an amount of the conductive agent 23 incorporated in the fibrous binder 22 is small may be produced. In contrast, using binder particles having a D50 of larger than 100 μm requires, for example, a large shear force, a long-time treatment, and the like, leading to the occurrence of the particle crack of the active material 21, the incorporation of the conductive agent 23 in the fibrous binder 22, poor formability of the sheet, and a lowered rupture strength. It is to be noted that producing binder particles having a D50 of smaller than 5 μm is not practical since it is significantly difficult or only extremely small amount thereof may be produced.

The D50 of the binder particles is measured by using a laser diffraction-type particle size distribution measuring device (LA-920, manufactured by HORIBA, Ltd.) with water as a dispersion medium. The D50 of the binder particles is preferably 80 μm or smaller, more preferably 50 μm or smaller, and particularly preferably 30 μm or smaller. The D50 may be controlled with, for example, a condition of polymerizing PTFE, or may also be controlled within the range of 5 to 100 µm by crushing PTFE particles having a D50 of larger than 100 µm.

In the first step, the binder particles are preferably fibrillated so that the rupture peripheral speed ratio of the electrode mixture 20 is 8 or more. The rupture peripheral speed ratio of the electrode mixture 20 becomes indicators of dispersibility of the constituting materials and consequently formability and rupture strength of the electrode mixture sheet 12. As a result of investigation by the present inventors, it has been found that using the binder particles having a D50 of 5 to 100 µm and performing the mixing treatment with a relatively low shear force in a short time are significantly important in terms of inhibition of the crack of the active material and improvement in the dispersibility of the constituting materials to improve the formability and the rupture strength of the electrode mixture sheet 12. The rupture peripheral speed ratio of the electrode mixture 20 determines an endpoint of the fibrillation of the binder particles and a step of mixing the active material 21, the fibrous binder 22, and the conductive agent 23.

Although conventionally known apparatuses may be used for the mixer 40, a mixer requiring pressure application with compressed air, such as a jet mill, is preferably not used. Using a jet mill excessively enlarges a shear force applied to the materials, and is likely to cause a particle crack of the active material 21. It is to be noted that excessively long mixing time increases an amount of the conductive agent 23 incorporated in the fibrous binder 22. In this case, electroconductivity of the electrode mixture sheet is significantly lowered to increase the resistance, and adversely affects the battery performance. Excessively long mixing time excessively advances the fibrillation of PTFE to lower the rupture strength of the sheet.

Accordingly, preferably used for the mixer 40 is a mechanically stirring mixer requiring no pressure application with compressed air. Specific examples of a preferable mixer 40 include: a cutter mill, a pin mill, a beads mill, a fine particle composer (a machine that generates a shear force between a rotor having a special shape and rotating at a high speed inside a tank and an impact plate), which are machines that may apply a mechanical shear force; a granulator; a kneader such as a twin screw extruding kneader and a planetary mixer. Among them, a cutter mill, a fine particle composer, a granulator, and a twin screw extruding kneader are preferable. A treating time of the first step (time for applying a shear force to materials) is preferably 0.5 to 10 minutes, and more preferably 1 to 5 minutes.

As illustrated in FIG. 1(b), the electrode mixture 20 is rolled by using two rolls 30 to form the sheet in the second step. The two rolls 30 are disposed with a predetermined gap, and rotate in the same direction. The electrode mixture 20 is fed into the gap between the two rolls 30 to be compressed with the two rolls 30, to be stretched into a sheet. The two rolls 30 have, for example, the same roll diameter. The obtained electrode mixture sheet 12 may be passed through the gap between the two rolls 30 a plurality of times, and may be stretched by using another roll having a different roll diameter, peripheral speed, gap, and the like one or more times. The roll may be heated to heat-press the electrode mixture sheet 12.

A thickness of the electrode mixture sheet 12 may be regulated with, for example, the gap between the two rolls 30, the peripheral speed, the number of the stretching treatment, and the like. In the second step, the electrode mixture 20 is preferably formed into a sheet by using two rolls 30 having peripheral speeds differing by a factor of two or more. Setting the peripheral speeds of the two rolls 30 to be different facilitates the thinning of the electrode mixture sheet 12 to improve the productivity, for example. The peripheral speed ratio of the two rolls 30 is preferably 2.5 or more, and may be 3 or more. The peripheral speed ratio of the two rolls 30 is, for example, 1:3. Since a larger peripheral speed ratio enlarges the shear force applied to the electrode mixture sheet 12, the electrode mixture sheet 12 is required to have a high rupture strength.

Next, as illustrated in FIG. 2, the electrode mixture sheet 12 is laminated onto the core 11 to obtain the electrode 10 in which a mixture layer composed of the electrode mixture sheet 12 is provided on the surface of the core 11 (hereinafter, this step is referred to as "third step"). Although FIG. 2 illustrates a state where the electrode mixture sheet 12 is joined to only one surface of the core 11, the electrode mixture sheet 12 is preferably joined to both the surfaces of the core 11. The two electrode mixture sheets 12 may be joined to both the surfaces of the core 11 simultaneously. It is also acceptable that one sheet is joined to one surface of the core 11 and then another sheet is joined to the other surface.

In the third step, the electrode mixture sheet 12 is laminated onto the surface of the core 11 by using two rolls 31. The two rolls 31 have, for example, the same roll diameter, disposed with a predetermined gap, and rotate in the same direction at the same peripheral speed. The two rolls 31 are preferably heated to a predetermined temperature and preferably apply a predetermined pressure.

The electrode 10 manufactured via the above steps has good appearance and a high rupture strength, as demonstrated in the following Examples.

EXAMPLES

Hereinafter, the present disclosure will be further described with Examples, but the present disclosure is not limited to these Examples.

Example 1

[Production of Positive Electrode Mixture]

A positive electrode active material (lithium-transition metal composite oxide, D50: 15 µm), PTFE particles having a D50 of 9 µm, and acetylene black (D50: 0.035 µm) at a mass ratio of 100:4:0.9 were added into a mixer (Wonder Crusher, manufactured by OSAKA CHEMICAL Co., Ltd.) to perform a mixing treatment at room temperature under a condition of a number of rotation of 14000 rpm for 2 minutes. This mixing treatment yielded a positive electrode mixture in which the PTFE particles were fibrillated, and the active material, the fibrous PTFE, and acetylene black were uniformly dispersed. The obtained positive electrode mixture had a solid content concentration of 100%.

[Production of Positive Electrode Mixture Sheet]

The obtained positive electrode mixture was rolled by passing between two rolls to produce a positive electrode mixture sheet. A peripheral speed ratio of the two rolls was set to be 1:3 to regulate a thickness of the positive electrode mixture sheet to be approximately 100 pun.

On the obtained positive electrode mixture and the positive electrode mixture sheet, a rupture strength and film formability (appearance) of the sheet were evaluated with the following methods. Table 1 shows the evaluation results together with a composition, D50, and treating time with the mixer of the binder particles.

[Evaluation of Rupture Strength]

Separately to the production of the above positive electrode mixture sheet, a test sheet was formed and a rupture peripheral speed ratio was measured to evaluate a rupture strength. When the positive electrode mixture was formed into a sheet as in FIG. 1(b), a linear pressure of the two constant-pressure rolls was set to be approximately 0.03 t/cm, a gap thereof was set to be 0 μm, a peripheral speed of one roll was fixed to be 5 m/min, and the test sheet was formed info a sheet with changing the peripheral speed ratio by 1 from 1 to 10 to specify the smallest peripheral speed ratio in peripheral speed ratios at which the sheet was ruptured as the rupture peripheral speed ratio. The rupture strength of the sheet was evaluated. The measurement of the rupture peripheral speed ratio was performed a plurality of times, and an averaged peripheral ratio of the smallest peripheral ratios when the sheet was ruptured in each measurement was specified as the rupture peripheral speed ratio.

[Evaluation of Film Formability]

The positive electrode mixture sheet obtained by producing the positive electrode mixture sheet was visually observed to evaluate a presence of a white line derived from poor dispersibility of the fibrous PTFE. A case where almost no white line was observed and the fibrous PTFE was uniformly dispersed was described as Good. A case where many white lines were observed and there are much ununiform fibrous PTFE was described as Poor. The sentence "a case where many white lines were observed and there are much ununiform fibrous PTFE" means that PTFE was insufficiently fibrillated and white lines were observed due to the presence of large PTFE particles.

Example 2

A positive electrode mixture and a positive electrode mixture sheet were produced to evaluate the sheet in the same manner as in Example 1 except that PTFE particles having a D50 of 20 μm were used instead of the PTFE particles having a D50 of 9 μm in the production of the positive electrode mixture.

Comparative Example 1

A positive electrode mixture and a positive electrode mixture sheet were produced to evaluate the sheet in the same manner as in Example 1 except that PTFE particles having a D50 of 500 μm were used instead of the PTFE particles having a D50 of 9 μm in the production of the positive electrode mixture.

Comparative Example 2

A positive electrode mixture and a positive electrode mixture sheet were produced to evaluate the sheet in the same manner as in Example 1 except that PTFE particles having a D50 of 20 μm were used instead of the PTFE particles having a D50 of 9 μm, and the treating time with the mixer was changed to 10 minutes, in the production of the positive electrode mixture.

TABLE 1

| | Binder particles | | Time of mixing treatment (minute) | Evaluation of positive electrode mixture sheet | |
|---|---|---|---|---|---|
| | Composition | D50 (μm) | | Rupture peripheral speed ratio | Film formability |
| Example 1 | PTFE | 9 | 2 | 10 (1:10) | Good |
| Example 2 | PTFE | 20 | 2 | 9 (1:9) | Good |
| Comparative Example 1 | PTFE | 500 | 2 | 5 (1:5) | Poor |
| Comparative Example 2 | PTFE | 20 | 10 | 6 (1:6) | Good |

From the evaluation results shown in Table 1, any of the positive electrode mixture sheets of Examples are found to have better film formability (appearance) and a higher rupture strength than the positive electrode mixture sheet of Comparative Example 1. The positive electrode mixture sheets of Examples have good dispersibility of the active material, the fibrous PTFE, and the acetylene black and less particle crack of the active material, and much conductive agent adheres to the particle surface of the active material. Therefore, using the positive electrode mixture sheet of Example may yield a positive electrode having excellent electron conductivity and rupture strength. In contrast, the positive electrode mixture sheet of Comparative Example has poor dispersibility of the materials, leading to poor film formability and a low rupture strength.

In the positive electrode mixture sheet of Comparative Example 2, the rupture peripheral speed ratio was lowered even with using the same binder particles as in Example 2. In Comparative Example 2, the rupture peripheral speed ratio was lowered even with the time of mixing treatment of the positive electrode mixture was five times as long as the time of mixing treatment of the positive electrode mixture in Example 2. From the result of Comparative Example 2, it is presumed that excessively long mixing time excessively advances the fibrillation of PTFE, and consequently lowers the rupture strength.

As above, in order to manufacture a good electrode mixture sheet and electrode, it is required that the binder particles having a D50 of 5 to 100 μm is used and the mixing treatment is performed with a relatively low shear force in a short time in the production of the electrode mixture.

REFERENCE SIGNS LIST

10 Electrode
11 Core
12 Electrode mixture sheet
20 Electrode mixture
21 Active material
22 Fibrous binder
23 Conductive agent
30, 31 Roll
40 Mixer

The invention claimed is:
1. A method of manufacturing an electrode, the method comprising:
applying a shear force to a particulate binder having a median diameter on a volumetric basis of 5 to 100 μm for fibrillation to produce a fibrous binder;
mixing the fibrous binder and an active material to produce an electrode mixture having a solid content concentration of substantially 100%, and fibrillating the particulate binder so that, in forming the electrode mixture into a sheet, a rupture peripheral speed ratio, defined as a peripheral speed ratio of a pair of forming rolls when the sheet is ruptured, is 8 or more, wherein in measuring the peripheral speed ratio, a linear pressure of the two rolls is set to be 0.03 t/cm, a gap thereof is set to be 0 μm, and a peripheral speed of one roll is set to be 5 m/min;

rolling the electrode mixture and forming into a sheet to produce an electrode mixture sheet; and laminating the electrode mixture sheet onto a core.

2. The method of manufacturing an electrode according to claim 1, wherein the particulate binder is of particles mainly composed of polytetrafluoroethylene.

3. The method of manufacturing an electrode according to claim 1, wherein in a step of producing the electrode mixture sheet, two rolls having peripheral speeds differing by a factor of two or more are used to form the electrode mixture into a sheet.

4. The method of manufacturing an electrode according to claim 1, wherein fibrillating the particulate binder and mixing the fibrous binder and the active material are simultaneously performed by using a mechanically stirring mixer requiring no pressure application with compressed air.

* * * * *